United States Patent Office 2,956,519
Patented Oct. 18, 1960

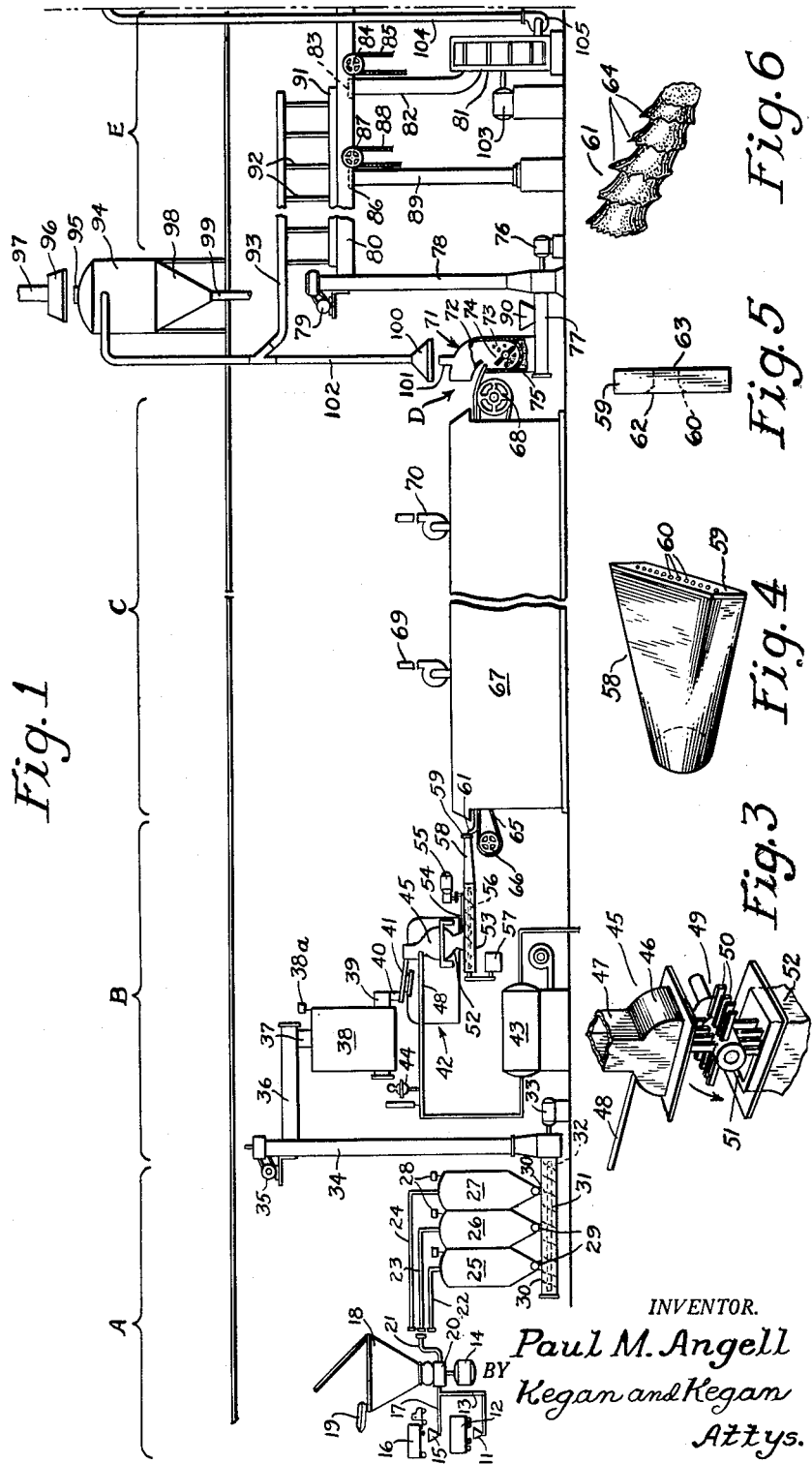

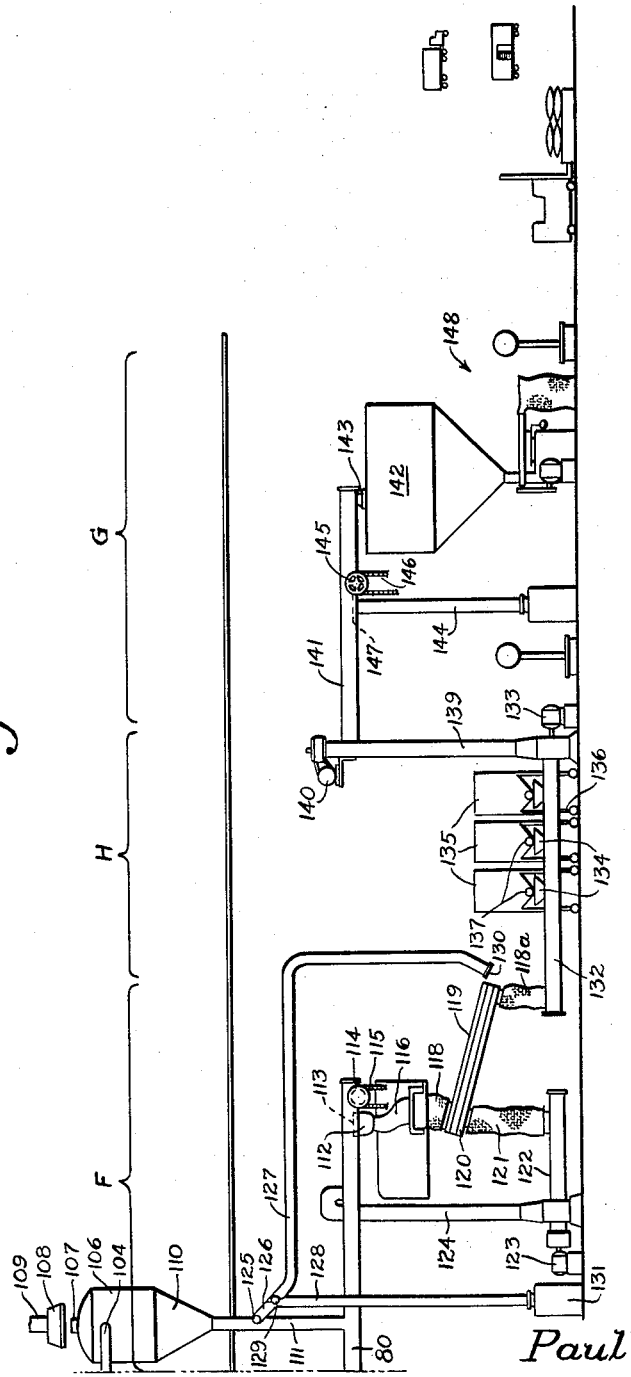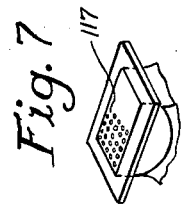

2,956,519
PROCESS OF AND APPARATUS FOR PRODUCING CRACKER MEAL AND THE LIKE

Paul M. Angell, 4905 Woodlawn Ave., Chicago, Ill.

Filed Jan. 6, 1956, Ser. No. 557,676

7 Claims. (Cl. 107—4)

This invention relates to methods of manufacture and apparatus for making bakery products, and more particularly to apparatus and an automatic continuous method for producing cracker meal. The term "cracker meal" as used in this specification and the appended claims includes any of the well known comminuted bakery products, such as cracker meal, bread crumbs, and breading, whether seasoned or not.

As a result of the increased popularity of foods which are pre-cooked, packaged, and frozen, there has been an increasing demand for cracker meal; since breaded products lend themselves readily to such processes. The demand for cracker meal as a thickening agent for such products as soups, whether canned, dehydrated, or frozen has also grown along with the increased popularity of the products. And the use of cracker meal as a filler for meat and similar products is well known in the food industry. Retail packages of cracker meal also have received growing interest, since the storing and grating of stale bread are thereby eliminated. In the face of this growing demand, however, little progress has been made in the baking industry to develop and produce apparatus and methods intended primarily to be used for the production of cracker meal.

In the baking industry cracker meal is generally a by-product of ordinary baking processes. The prevailing practice is to bake crackers, cookies, or biscuits on equipment set up for such purpose, and thereafter break the baked product into cracker meal. Thus, a batch of dough is mixed and passed through suitable plain rolls which form it into sheets which may or may not be continuous. Forming rolls thereafter press the sheets to size, after which the dough either is cut or embossed to produce the particular cracker the equipment and system is intended to make. After they are rolled and embossed, the sheets are carried on an endless conveyor belt through a continuous oven for baking.

Once out of the oven, the baked crackers are inspected and sorted. Those crackers which fail to meet prescribed standards then are separated either by hand or by automatic means from the others for eventual breaking into cracker meal. The rejects are stored until a sufficient quantity is available to run through comminution equipment. Since the rejects may not provide a source sufficient to meet the cracker meal demand, alternatively the entire production of a line may be broken into cracker meal. In either case, however, since neither the baking system nor the sorting line is set up primarily for cracker meal, it is necessary to collect the crackers into bins which are then transported to a comminution line which produces the desired grade and size of cracker meal.

This long used method is characterized by several obvious disadvantages, which, however, have not been overcome prior to the present invention. An outstanding objectionable feature of present practice is the fact that the processes are sporadic. That is, there is no continuity of material flow from the flour storage bin between the intermediate steps, to final comminution of the baked product. The dough is formed in batches rather than continuously. Interruptions occur during the sorting or separating stages and between the collecting stage and the comminution steps. Rejects may be stored for some time before a sufficient quantity is gathered for breaking. Also, a considerable amount of handling is required for sorting, whether it is done by hand or by mechanical means. And, in either of these instances, both the additional sorting equipment and the hand labor increase the processing cost. Then too, a great deal of unnecessary work and equipment are brought to play on the dough to carefully form it into embossed sheets which ultimately are destined to be broken up.

Further, the unnecessary rolling and embossing more often than not have a detrimental effect on the dough. The impacts of the rollers and the embossing dies unavoidably change the sponginess of the dough to a degree which undesirably affects the texture and condition of the baked product. A process which eliminates such rolling and embossing steps, therefore, is highly desirable.

Another factor that must be considered is that the cracker meal must meet certain standards in order to be suitable for its intended use. Thus, the texture, color, and composition of cracker meal which is intended for one use may be entirely different from that which is intended for another use. Accordingly, a close control must be maintained not only over the mixing processes but also over the baking steps as well. Obviously, however, when a production run is for the purpose of producing crackers rather than cracker meal, the close controls over the mixing, forming and baking steps are for producing the best cracker possible. Consequently, the rejects, which are separated for many reasons, when broken into cracker meal more often than not lack any uniformity of appearance and texture. It is apparent at once, therefore, that controls suitable for producing crackers are not acceptable for cracker meal.

Even when an entire production run is to be broken into cracker meal, experience has shown that the outer edges of the baked sheet are generally overbaked and quite brown. This excessive browning, which is one of the factors causing cracker rejection, is due to the higher temperature of the dough at the edges of the thin sheet of dough than at the intermediate portions thereof. This may be explained by the greater ratio of surface area to volume of dough at the edges than at the remainder of the sheet, since the heat is delivered to the sides as well as to both sheet faces. Even with the most rigid control over the dough ingredients and the baking oven, it is difficult to avoid overbaking of the edge portions if the intermediate portion is to be properly baked. Also to be considered is the fact that the edge portions tend to distort under heat and thus bring themselves to a position whereat they may be exposed to greater heat concentration. An entire output, thus lacks any degree of uniformity; while the rejects are no more than an aggregation of properly baked but broken crackers, and overbaked crackers. From such heterogeneous accumulations it is often impossible to produce a cracker meal product having to meet prescribed standards.

Then too, from a sanitation aspect, the present practices leave much to be desired. Besides the time delays involved in present day cracker meal processing methods to sort and convey the baked product from the mixing and baking equipment to the comminution equipment, the storage and excessive handling of the baked product lays it open to attack by outside influences. This, in turn, increases the opportunity for contamination by handling and exposure to air even though the baked product leaves the oven in a sterile condition. And, as is well known in the baking industry, overexposure of the baked product to air increases its opportunity to absorb moisture and consequently lessens the quality of the product.

Advantageously, the present invention contemplates the use of equipment and a novel method especially adapted to the manufacture of cracker meal. Moreover, the process is continuous, with neither the dough nor the baked product experiencing any excessive handling, time delays or undue exposure to contaminating influences.

In its broad aspects, therefore, the present invention for producing cracker meal comprises the apparatus for and continuous steps of mixing and blending, forming the dough into continuous progressions of ribbons or ropes by extruding the dough under pressure, baking the ropes of dough, and breaking the baked product into the desired size of cracker meal. During the breaking or comminution stage, the pieces are screened in order to achieve the desired size, after which the cracker meal is weighed and packaged in moisture resistant containers.

Accordingly, it is an object of this invention to overcome the aforementioned and other defects present in known apparatus and methods for producing cracker meal.

Another object of this invention is to provide a fully automatic and continuous system for making cracker meal, and which performs all necessary operations between the flour bin and comminution apparatus without any undue time delays between the successive steps.

Still another object of this invention is to provide an automatic, continuous and uninterrupted method for making cracker meal, operating with a minimum amount of labor or attendance, with all unnecessary operations being eliminated.

A further feature of this invention is the provision of a cracker meal product of improved taste, texture, and appearance.

Another feature of this invention is the provision of a method of manufacturing cracker meal products in which the food product need not be touched by human hands and is substantially protected during its manufacture, thereby lessening the chance of contamination by outside influences.

An essential feature of this invention is the provision of means and novel steps for continuously mixing the green dough and continuously forming the dough into progressions of dough ropes prepared for baking, the shape of said dough ropes being such as to increase the ratio of dough surface to weight and thus enable the oven length and the time of baking to be considerably cut down while producing a uniformly baked product.

A still further object of this invention is the provision of a series of novel continuous milling steps whereby a closer control is allowed in order to achieve the desired size and texture of the final cracker meal product.

While crackers generally require, besides flour and water, leavening agents, butter or other edible oils, and other ingredients, it is a feature of the present invention that only those ingredients necessary to the production of cracker meal are used, thereby resulting in a considerable savings of materials.

And, it is another object of this invention to provide a simplified method of producing an improved cracker meal product in an efficient, rapid, sanitary, and inexpensive manner.

The foregoing and other objects, advantages and features of construction will be more apparent when considered in connection with the following description and accompanying drawings.

In the drawings:

Figure 1 is a diagrammatic side elevation view showing a portion of the essential elements of the apparatus for carrying out this invention;

Figure 2 is a view similar to that of Figure 1 but showing the remainder of the apparatus for carrying out this invention;

Figure 3 is a blown-up perspective view of the spray blend comminutor for mixing the dough;

Figure 4 is a perspective view of the extrusion dough chamber and plate for extruding the dough ropes;

Figure 5 is a side elevational view of the extrusion plate;

Figure 6 is a perspective view of the dough rope as it comes from the extrusion plate; and Figure 7 is a partial perspective view of the screen within the final comminutor mechanism.

Referring to the drawings, among its features the invention embodies unloading and storage equipment A, spray blending and extrusion apparatus B for producing dough and delivering it in the form of ropes to baking equipment C, chopper D for breaking the baked product into a size suitable for conveying, cooling and pre-grind equipment E, comminution and sifter assembly F for producing the desired size cracker meal, and packaging apparatus G. The invention further contemplates the use of blending equipment H for adding seasonings to the comminuted product when such is desired. As is apparent from the drawings, all operations are automatic and continuous, with automatic conveyors moving the materials between the successive steps.

The flour handling and unloading equipment is so arranged that flour may be transferred to storage bins from a truck or a train siding in bulk, or may be transferred to the storage bins from bags. To accomplish this, an air conveyor system is provided, with a single blower supplying the motivating means for transporting the flour to the storage bins. At the railroad siding a receiving hopper 11 is provided for receiving bulk flour delivered by freight cars 12. The flour is gravity fed from car 12 into hopper 11, after which it is conveyed along with air moved through conduit 13 by the suction created by blower 14. Similarly, a receiving hopper 15 is provided at a truck siding for receiving bulk flour gravity fed from trucks 16, afterwhich the flour is conveyed through conduit 17. Within the plant a third hopper 18 is provided to receive flour emptied from bags 19.

A plenum 20 is connected with the discharge side of blower 14, and has a flexible coupling 21 for removable attachment to any one of three conduits, 22, 23, 24, leading to bulk flour storage bins, 25, 26, 27 respectively. In this manner, different types and grades of flour may be selectively moved to their proper bins for storage. Electronic probes 28 of well-known construction, at the top of each storage bin, serve to cut out blower 14 when any bin, to which flour is being fed, is filled.

Unloading and storage of the flour thus is handled in an extremely efficient, rapid and sanitary manner. Once the flour is received in the hoppers 11, 15, or 18, it is pneumatically conveyed to the proper storage bin in a matter of seconds, allowing unloading of an entire freight car or van to be accomplished in about an hour.

The flour handling equipment additionally includes at the bottom of each storage bin a screw conveyor 29 for delivering the selected flour to be used for baking through a chute 30 to horizontal casing 31 wherein a screw conveyor 32 is turned by motor 33 to move the flour to vertical casing 34. A screw, driven by motor 35 and similar to the conveyor screw 32, transports the flour vertically upward to horizontal casing 36, wherein the flour is screw conveyed to a vertical chute 37 leading to a surge hopper 38. Hopper 38 assures that adequate supply of flour is available at all times, thus allowing the continuous production of dough, as hereinafter described. An electronic probe 38a of well known construction is provided at hopper 38 to sound a maximum and minimum hopper level warning.

Flour discharge from hopper 38 is accomplished through a similar single pitch screw feed in horizontal casing 39 and drop chute 40 to a vibrating leveler chute 41 of well-known construction, from which the flour drops into a mixer, indicated generally at 42, wherein it is wet-mix blended. For the wet-mix blending, city water, at a pressure of approximately 15 p.s.i., is heated in boiler 43 to a temperature of around 200° F., after which it is throttled down by regulator 44 of well-known construction to a pressure of approximately 3 to 5 p.s.i. and delivered to the spray blend comminutor 45 within mixer 42. Slight adjustments made in the regulator correspondingly permit flexible proportioning of water for different products.

The screw within casing 39, being single pitch, does not deliver a continuous flow of flour, but rather delivers the flour intermittently in what may be considered as one flightful per screw revolution. However, in order to produce a dough which is consistent throughout the continuous process, the flour must be fed at a continuous even flow to spray blend comminutor 45. This, therefore, is the purpose of the noted vibration leveler 41 which levels out the flour fed by the uneven feed pulsations of the screw casing 39; hence, assuring a smooth even flow of flour into comminutor 45.

Referring to Figure 3, the flour drops from vibration leveler 41 into the spray blend chamber 46 through a neck portion 47. Hot water is sprayed from a pipe 48 through orifice plates (not shown) into contact with the falling flour. The falling flour and the sprayed water fall into and pass through blend chamber 46. Therein, they encounter a rotating hammer unit 49 comprising blades 50 fixed on the illustrated shaft, which is rotated rapidly, as by a separate drive motor (not shown). The purpose of the hammer unit is to thoroughly blend together the falling flour and water before they leave the blending chamber through outlet 52 as homogeneous dough. The hammer unit delivers about 50,000 impacts per minute. Thus, the incremental blending of flour and water as they fall through the path of the rotating blades achieves a thorough continuous mixing and feeding of the dough. The flour and water, of course, are fed at such controlled rates as to provide the desired dough composition and consistency.

The dough-handling mechanism, as seen in Figures 1, 4 and 5, comprises a drop chute 52 through which the dough falls to a horizontal casing 53, in which a rotating single pitch screw conveyor 56, driven by motor 57, transports the dough toward the baking equipment C. Immediately below chute 53 a horizontal reciprocating scraper 54, driven by motor 55, maintains the chute opening clean to allow the dough to fall freely into casing 53. Adjacent the discharge end of screw 56, the dough enters a chamber 58 having sides diverging towards an extrusion plate 59 having a plurality of transverse spaced openings 60 through which the dough, under a minimum pressure of approximately 100 p.s.i., is permitted to pass in the form of approximately sixty dough ropes 61, each about ½ to ¾ inches in diameter.

As best seen in Figure 5, the leading end 62 of each opening 60 is chamfered to aid in the promotion of a phenomenon whereby the dough ropes desirably are formed with ripples or ridges, as hereinafter described. It has been found that the leading edge of opening 60 also can be beveled or formed with a countersunk portion to achieve a similar dough structure.

Figure 6 shows a portion of a dough rope as it appears after leaving the discharge end 63 of an opening 60. As the dough rope leaves the opening, it is formed into a progression or series of ridges 64, thus increasing the surface area of the rope. Advantageously, this desirable feature enables the baking time and oven chamber length to be appreciably reduced for any given baking temperature.

The first of the basic reasons for the intermittent formation of the ridges 64 may be explained by the physical structure of the extrusion screw 56 and its method of conveying the dough. Like the screw conveyor in casing 39, screw 56 may be considered as delivering dough in pulsations of feed rather than continuously. The result is that the dough within chamber 58 experiences variations in pressure which manifest themselves as ridges 64.

When investigating the ridge phenomenon, however, the physical properties of the dough itself must also be kept in mind. The dough exhibits many of the properties of a plastic, and hence has the ability to absorb a certain amount of compression because of its resiliency. As a result, the dough absorbs a great deal of the thrust delivered on it by screw 56 before it willingly passes through an opening 60 in the form of a rope. After absorbing a certain amount of compression, the dough's resiliency apparently augments the pulsations caused by screw 56, thus aiding in the formation of ridges 64 as the continuous dough rope 61 is extruded through openings 60.

In experimenting with different screws 56 and openings 60, it was found, although in accordance with the basic idea of the invention, that rather substantially different dough rope formations could be achieved, depending upon the design of the openings 60. Originally when the idea of increasing the baking area-to-weight ratio first was considered, it was felt that for the purpose of extrusion an ordinary cylindrically shaped hole would serve adequately as the extrusion opening. Experiments showed, however, that such a simple opening produced only the slightest of ripples or nearly none at all; and that, hence, such an opening would not suffice for the purposes of the feature of the invention illustrated in Figure 6. Subsequently, it was found that by roughing up or providing a chamfer or countersunk portion at the leading edge of the opening, as at 62, the desired ridge formation was achieved. Apparently this may be explained by the plastic qualities of the green dough which at the chamfered portion of the opening 60 absorbs a great deal of compression and is held in this state as it thereafter travels towards the discharge end 63 of the opening. At the discharge end the dough, no longer being under any restraint, rapidly expands to form a ridge 64. These compressions and subsequent expansions of the dough occur at regular intervals to thus aid in forming the intermittent ridge formations. Hence, by the necessary expedient of a single pitch screw and a specifically shaped extrusion opening, together with the plastic qualities of the green dough, a ridged continuous rope of dough is formed which by its very shape and structure increases baking efficiency while cutting down baking time.

Baking equipment C comprises an endless conveyor 65 adjacent to and slightly below extruder plate 59. Conveyor 65 is of the mesh belt type so as to expose the underpart of the dough ropes as well as the top and sides for baking. Desirably the speed of conveyor 65 is somewhat greater than the rate of feed of the ropes of dough thereto to avoid folding of the green dough ropes. A motor-driven sprocket wheel 66 moves the conveyor through oven 67, from where it travels over wheel 68 for its return flight. Conventional burners are provided at both the top and bottom of oven 67 to allow maximum baking to be achieved in the approximately 120 foot oven length. At the top of oven 67 spaced exhaust blowers 69 and 70 are provided to remove the products of combustion to atmosphere. The oven baking temperature is normally held between 450 and 550° F.

From oven 67 the baked ropes are fed by conveyors 65 over a table into a chopper, indicated generally at 71. Within chopper 71, a deflector plate 72 is encountered which acts to deflect and break the now relatively rigid baked ropes, as they are fed therein, causing the pieces to drop to within a chopper chamber 73 wherein a wide chopper blade 74 mounted on a motor driven shaft breaks the pieces into approximately ½ inch lengths for conveying. The noted lengths result from the blade 74 making one-half a revolution for about each one-half inch advancement of the baked ropes. A screen 75 allows those pieces which are suitably sized for conveying to pass therethrough.

From the chopper the pieces pass to a screw conveyor, driven by motor 76, within horizontal casing 77 for passage to a vertical casing 78 wherein a screw conveyor, driven by motor 79, transport the pieces upwardly to horizontal casing 80. Within casing 80, the warm cracker meal pieces are screw conveyed along towards a pre-grind mill 81 of conventional construction and driven by motor 103 whereto they are gravity fed through drop chute 82. Mill 81 may, for example, be of any well-known coarse-grind construction, such as is used to grind corn into meal or to grind corn and other feed grain into a coarse mixture for feeding cattle, hogs, chickens, and the like. A mill of this type is disclosed in Food Engineering, vol. 27, No. 12, December 1955, in the following articles:

(1) "Flour to Product in 17 Minutes," by Paul Angell and George M. Kovac, pages 81 to 83, and 161; and (2) "Non-Stop Cracker Meal Line" page 120, with fold-out flow sheet and illustrations on pages 121 to 123.

A discharge gate 83, positionable by a conventional sprocket 84 and chain 85 arrangement, is provided to allow the pieces to fall to pre-grind mill 81. An auxiliary discharge gate 86, positionable by sprocket and chain 87 and 88, respectively, is provided to allow the pieces to fall through auxiliary chute 89 when such is so desired, as when there is a breakdown in subsequent operations. Ultimately the pieces removed through auxiliary chute 89 may be returned to the system through hopper 90 leading into casing 77.

Passage of the pieces through casing 80 is over a sufficient distance as to allow them to cool sufficiently. In practice it was found that a distance of approximately 125 feet between vertical casing 78 and auxiliary discharge chute 89 is sufficient to enable the pieces to cool adequately. To remove the heat within casing 80 an exhaust plenum 91 is provided at the top, and has a series of spaced ducts 92 leading to an exhaust duct 93. The hot air and any cracker meal dust particles carried thereby are pulled through the cooling system by means of a cyclone separator 94. At the top of the cyclone separator is an outlet 95 for passing exhaust air to a hood 96 connected to a duct 97 leading to atmosphere. The separated cracker meal dust particles, in the meanwhile, fall into hopper 98 where they are collected for ultimate disposal as desired through duct 99. Cyclone separator 94 also is connected to a vent hood 100 adjacent the top of chopper chamber 73 for removing fine cracker meal dust particles through exhaust outlet 101 to duct 102 leading to separator 94.

Within the pre-grind mill 81, driven by motor 103, the particles are ground into coarse cracker meal. Thereafter, the particles are there entrained in air and are conveyed upwardly through duct 104 by the action of blower 105 which pulls them from mill 81 and delivers them to a second cyclone separator 106. Within separator 106 the conveying air is removed from the entrained particles and passes through an outlet 107 to a hood 108. A duct 109 thereafter passes the air stream to atmosphere, while the separated and further cooled preground particles are collected in a hopper 110.

From hopper 110, the further cooled coarse cracker meal is returned to casing 80 through duct 111 and is screw conveyed to a drop chute 112 adjacent the end thereof. A discharge gate 113 also is provided at chute 112, and is opened and closed by the operation of sprocket 114 and chain 115. Duct 112 leads to a comminutor 116 wherein the final finely comminuted product is produced. The construction of the hammer unit of comminutor 116 is similar to that of spray blend comminutor 45, shown in Figure 3, except that at its discharge opening comminutor 116 is provided with a sizing screen 117, as shown in Figure 7. As the cracker meal is fed through duct 112, it is picked up by the action of the hammer unit, impacted in air and passed through screen 117. Those particles not properly reduced in size bounce back into the path of the rotating hammer blade for further impact and breaking. The operation is continuous and sufficiently rapid as to comminute the cracker meal particles as they are continuously fed from casing 80, with the hammer unit delivering over 200,000 impacts per minute.

From screen 117, the comminuted cracker meal passes through a cloth duct 118 and into a vibrating shaker sifter 119 of well-known construction which has an interchangeable screen (not shown) for sifting the cracker meal. The screen allows only the properly sized cracker meal to pass therethrough and to cloth duct 118a leading toward final packaging. The tailings, or those cracker meal particles too large to pass through the sifter screen, ultimately work their way to an outlet 120 and through cloth duct 121 to casing 122 wherein a screw conveyor, driven by motor 123, moves them to vertical casing 124. Within casing 124, the tailings are screw conveyed upwardly to casing 80 for a return flight through comminutor 116 and further comminution.

As seen in Figure 2, the further cooled coarse cracker meal may be made to follow alternative paths from hopper 110. A gate 125 is provided in duct 111 and when closed acts to divert the cracker meal into an auxiliary pregrind discharge duct 126 having branches 127 and 128 which are fed by selective operation of another gate 129. Thus, the comminutor 116 may be by-passed when it is desired to package the coarse cracker meal. Cracker meal directed through duct 127 passes through duct outlet 130, which is connectable to cloth duct 118a for moving the coarse cracker meal towards final packaging. Alternatively, gate 129 can be operated to direct the coarse cracker meal through duct 128 so as to package it in bulk containers, such as bin 131.

Of course, it is further understood that discharge gates 83, 86 and 113 may be selectively opened and closed. Hence, it is possible to deliver the cracker meal pieces from chopper 71 directly to comminutor 116 or to final packaging.

Immediately below cloth duct 118a is another horizontal casing 132 wherein the comminuted cracker meal falls to be conveyed by a screw driven by motor 133. A portion of casing 132 is open at the top so that hoppers 134 may be attached thereto. Removable hoppers 135, mounted on wheeled trucks 136, may then be placed adjacent hoppers 134 to feed solid additives, such as seasonings, to the comminuted cracker meal if such is desired. Each additive hopper feeds the additive by means of a screw 137, the feed of which can be varied to get the correct mixture of cracker meal and additives. The screw within casing 132, unlike the other screw conveyors, is a cut and folded flight screw conveyor of well-known construction. The cut and folded parts of the flight screw (not shown) tumble the moving product to properly blend the cracker meal and the additives as they are moved along.

From casing 132 the cracker meal is again conveyed upwardly within vertical casing 139 by means of a screw conveyor driven by motor 140. Thereafter it is screw conveyed in horizontal casing 141 to a finished storage hopper 142 whereto it falls through a drop chute 143. An auxiliary discharge duct 144 also is provided for the comminuted cracker meal. Sprocket 145 and chain 146 control the positioning of discharge gate 147 which by its position determines whether the cracker meal is fed into duct 144 or to storage bin 142. An automatic packaging mechanism, indicated generally at 148, receives the cracker meal from hopper 142, bags it, and weighs the package which thereafter is sealed for shipping.

It is apparent from the foregoing that the casings wherein the materials are screw conveyed may be all of the same size so as to reduce the number of different parts necessary to make up the system. Further, each screw conveyor is independently driven to allow accurate control of the feed of the material between the different operations. The system, moreover, is sufficiently flexible as to allow rapid readjustment for the production of different types, grades and sizes of cracker meal. And for all cracker meal products within a period of a few minutes the dough is mixed, formed, baked, broken, milled, seasoned, sifted, and packaged.

By way of illustrating the advantages of the herein-described apparatus and method for making cracker meal, the apparatus and method have in actual commercial use led to very considerable savings, both by increasing machine productivity and by eliminating hand labor previously required. Thus, using the systems preceding the present invention, additional machinery was required to sort the crackers or to make sheets of dough, all of which were thereafter broken. Advantageously the new apparatus can produce approximately 6,000 pounds of cracker meal per hour while requiring no more than three operators or attendants. On an 8 hour a day basis, 48,000 pounds of cracker meal may be produced while expending merely 24 man hours of work. The great savings made possible are therefore manifest.

Besides reducing cost of manufacture, a more pure and wholesome food product than heretofore had been possible is achieved. Also to be considered is the fact that the taste and appearance are improved since the product is made under rigid controls set for the specific cracker meal product rather than being set to produce crackers or biscuits. With such rigid controls, moreover, vital properties, such as high and low absorption rates, and different moisture levels can be closely controlled for the different cracker meal products and their intended uses.

Although what has been shown and describde is a preferred embodiment of the invention, it is to be understood that the disclosure is not intended to be exhaustive nor limiting the invention, but instead is given for the purpose of illustration so that the invention may be understood, and that others skilled in the art may be enabled to modify and adapt it to various forms without departing from the spirit thereof, the scope of which is defined in the appended claims.

What is claimed is:

1. The method of preparing cracker meal which comprises the progressive steps of continuously forming a stream of dough, extruding the dough in the form of a plurality of aligned dough ropes having a series of transverse ridges, baking the dough ropes, breaking the baked ropes into relatively large pieces, grinding the pieces to a smaller size, centrifuging the ground pieces, moving the ground pieces through a rotating hammer unit for comminution, sifting the comminuted product, and continuously moving the materials between the aforementioned steps.

2. The method of continuously manufacturing cracker meal from a supply of dough, which comprises continuously conveying and baking dough from the said dough supply to provide a continuous supply of hot freshly baked product, continuously breaking up the hot freshly baked product into relatively large pieces, continuously moving the relatively large pieces along a cooling path while continuously moving air over them to cool them, continuously breaking up the cooled pieces into coarse cracker meal, continuously moving the coarse cracker meal along a further cooling path while moving air over it which further cools it, continuously further breaking up the further-cooled coarse cracker meal into fine cracker meal, and continuously conveying the fine cracker meal into storage for packaging.

3. The method of continuously manufacturing both coarse cracker meal and fine cracker meal in desired proportions, which comprises the steps according to claim 2 for producing fine cracker meal, and further comprises selectively diverting the further-cooled coarse cracker meal from the said step of further breaking it up, and continuously conveying the diverted coarse cracker meal into storage for packaging.

4. The method of continuously manufacturing coarse and fine cracker meal according to claim 3, which comprises conveying both the said coarse and the said fine cracker meal along a common seasoning path toward the said storage, continuously adding seasoning to the cracker meal traversing the seasoning path, and continuously mixing the seasoned product being conveyed to the said storage.

5. Integrated apparatus for continuously manufacturing cracker meal from a supply of dough, which comprises an oven, means for continuously conveying dough from the said dough supply into and through the oven to provide a continuous supply of hot freshly baked product, means for continuously breaking up the hot freshly baked product being conveyed out of the oven into relatively large pieces, means providing a first and a second cooling path, means for continuously moving the relatively large pieces along the first cooling path, means for continuously moving air over the pieces traversing the first cooling path to cool them, means located between the first and second cooling paths for continuously breaking up the cooled pieces into coarse cracker meal, means for continuously moving the coarse cracker meal along the second cooling path, means for moving air over the coarse cracker meal traversing the second cooling path which further cools such coarse cracker meal, means at the end of the second cooling path for continuously further breaking up the further-cooled coarse cracker meal into fine cracker meal, a pre-packaging storage bin, and means for continuously conveying the fine cracker meal into the said bin.

6. Integrated apparatus for continuously manufacturing both coarse and fine cracker meal in desired proportions, which comprises the apparatus according to claim 5 for producing fine cracker meal, and further comprises means for selectively diverting the further-cooled coarse cracker meal from the said means for further breaking it up, and means for continuously conveying the diverted coarse cracker meal into the said storage bin.

7. Integrated apparatus for continuously manufacturing both coarse and fine cracker meal according to claim 6, wherein the said conveying means comprises means for conveying both the said coarse and the said fine cracker meal along a common seasoning path toward the said storage bin, means for continuously adding seasoning to the cracker meal traversing the seasoning path, and means located along the seasoning path for continuously mixing the seasoned product being conveyed to the said storage bin.

References Cited in the file of this patent

UNITED STATES PATENTS

| | | |
|---|---|---|
| 1,118,182 | Brandell | Nov. 24, 1914 |
| 1,535,205 | Darrah | Apr. 28, 1925 |
| 1,726,435 | Haller | Aug. 27, 1929 |
| 1,790,347 | Hawkins | Jan. 27, 1931 |
| 2,072,920 | Holland-Letz | Mar. 9, 1937 |
| 2,173,000 | Holtzman et al. | Sept. 12, 1939 |
| 2,253,770 | Duffy | Aug. 26, 1941 |
| 2,255,282 | Duffy et al. | Sept. 9, 1941 |
| 2,281,609 | Walter | May 5, 1942 |
| 2,639,096 | Hinerfeld | May 19, 1953 |
| 2,640,033 | Marshall | May 26, 1953 |
| 2,704,257 | De Sollano et al. | Mar. 15, 1955 |
| 2,734,540 | Geisler | Feb. 14, 1956 |